United States Patent [19]

Jang

[11] Patent Number: 5,469,280
[45] Date of Patent: Nov. 21, 1995

[54] MULTI-LAYERED LIQUID CRYSTAL DISPLAY PANEL WITH AUXILIARY SUPPORTS FOR REINFORCEMENT OF INJECTION HOLES

[75] Inventor: In-Sik Jang, Kyungki-do, Rep. of Korea

[73] Assignee: Samsung Electronics Co., Ltd., Suwon, Rep. of Korea

[21] Appl. No.: 235,851

[22] Filed: Apr. 29, 1994

[30] Foreign Application Priority Data

Apr. 29, 1993 [KR] Rep. of Korea .................. 7336/93

[51] Int. Cl.⁶ .................. G02F 1/133; G02F 1/1335; G02F 1/1333
[52] U.S. Cl. .................. 359/53; 359/62; 359/79
[58] Field of Search .................. 359/53, 62, 79, 359/81, 51

[56] References Cited

U.S. PATENT DOCUMENTS

| | | | |
|---|---|---|---|
| 4,581,608 | 4/1986 | Aftergut et al. | 340/704 |
| 4,813,770 | 3/1989 | Clerc et al. | 359/53 |
| 4,878,741 | 11/1989 | Fergason | 359/53 |
| 4,886,343 | 12/1989 | Johnson | 359/53 |
| 5,113,272 | 5/1992 | Reamey | 359/53 |
| 5,148,297 | 9/1992 | Ishii et al. | 359/42 |
| 5,221,978 | 6/1993 | Heynderickx et al. | 359/53 |
| 5,386,307 | 1/1995 | Jang | 359/53 |

FOREIGN PATENT DOCUMENTS

| | | | |
|---|---|---|---|
| 57-196214 | 12/1982 | Japan | 359/53 |
| 5-134266 | 5/1993 | Japan | 359/94 |

*Primary Examiner*—Anita Pellman Gross
*Assistant Examiner*—Charles Miller
*Attorney, Agent, or Firm*—Charles R. Donohoe; Robert A. Westerlund, Jr.; Stephen R. White

[57] ABSTRACT

A liquid crystal display and manufacturing method therefor. The liquid crystal display includes two opposing electrodes, a plurality of electric-field-effect liquid crystal layers disposed between the two electrodes, insulating layers for dividing the liquid crystal layers, main supports for maintaining a predetermined distance between the insulating layers, and auxiliary supports provided about liquid crystal injection holes through the insulating layers, the auxiliary supports preventing the deformation of the liquid crystal injection holes and facilitating the injection of liquid crystal.

16 Claims, 6 Drawing Sheets

MULTI-LAYERED LIQUID CRYSTAL DISPLAY PANEL WITH AUXILIARY SUPPORTS FOR REINFORCEMENT OF INJECTION HOLES

Priority rights are based on Korean Application No. 7336/93 filed Apr. 29, 1993, which Korean Application is hereby incorporated by reference.

BACKGROUND OF THE INVENTION

The present invention relates to a liquid crystal display (LCD) panel and a manufacturing method thereof for use in optical displays, and more particularly, to an LCD panel and a manufacturing method thereof which has insulating layers for dividing a liquid crystal layer into multiple layers and supports for supporting the insulating layers.

A wide variety of liquid crystal displays have been developed as image display devices and cover a broad range of applications as a result of its lightweight and simple structure, similar to a plasma display panel or electroluminescent display. Moreover, the low drive voltage of such LCDs results in reduced power consumption.

Among currently used liquid crystal displays, simple-matrix and active-matrix types using a thin film transistor require at least one polarizer for light control because they employ twisted nematic (TN) or super twisted nematic (STN) liquid crystal. However, since a polarizer blocks over 50% of the light in the course of light polarization, the polarizer drastically reduces the light utilization efficiency of an image display device.

In order to obtain an image of an intended brightness in such a display, a background light source of high luminance must be adopted. Thus, liquid crystal displays are impractical for laptop wordprocessors or minicomputers using a dry cell or rechargeable battery due to their excessive power consumption which renders extended operation impossible.

Since general LCDs (including those using TN or STN liquid crystal) have a structure in which liquid crystal is filled between two glass plates, the distance between the two glass plates, that is, a cell gap which is a light controlling area, should be strictly controlled for the formation of a uniform image. However, given the present level of manufacturing technology for fabricating such glass plates, a large-screen LCD display cannot be realized.

Considering the above-discussed drawbacks, it becomes necessary to simplify the control of the cell gap by employing a single plate, and to counteract the negative effects on light utilization efficiency caused due to the polarizer.

According to the conventional technology, an LCD having no polarizer has also been developed. Such LCDs without polarizer include a cholesteric-nematic type liquid crystal which makes use of the phase transition effect and a dynamic scattering mode type liquid crystal which was an early development. The dynamic scattering mode LCD has a slow response and is relatively thick, which greatly impedes its application and ultimately restricts the scope of usage.

Another liquid crystal display without polarizer, and thus exhibiting better light efficiency, is a polymer-dispersed type. However, since over 50% of the volume of the polymer-dispersed liquid crystal is made up of light-transmitting polymer, dispersion should be performed effectively so as to enhance contrast and thereby improve clarity. For this purpose, the polymer-dispersed liquid crystal should be at least 20 μm thick, which is a structural limitation.

An electric-field-effect LCD having a novel structure to overcome the diverse problems in the conventional displays is disclosed in U.S. patent application No. 08/058,712 by Nobuyuki Yamamura, hereby incorporated by reference. Subsequently, improvement applications were filed by the applicant as U.S. patent application Nos. 08/111,063, 08/058,712, 08/169,283, 08/155,258, 08/169,244, 08/170,940, and 08/169,243, which are hereby incorporated by reference.

Having a rapid driving speed and high light-utilization efficiency, the above liquid crystal displays are constructed so that a liquid crystal layer placed between opposing electrodes is separated by a plurality of insulating layers to be thereby divided into multiple layers. Here, a single glass plate is employed without a polarizer and a function layer for light control lies above the plate.

Figure 1:
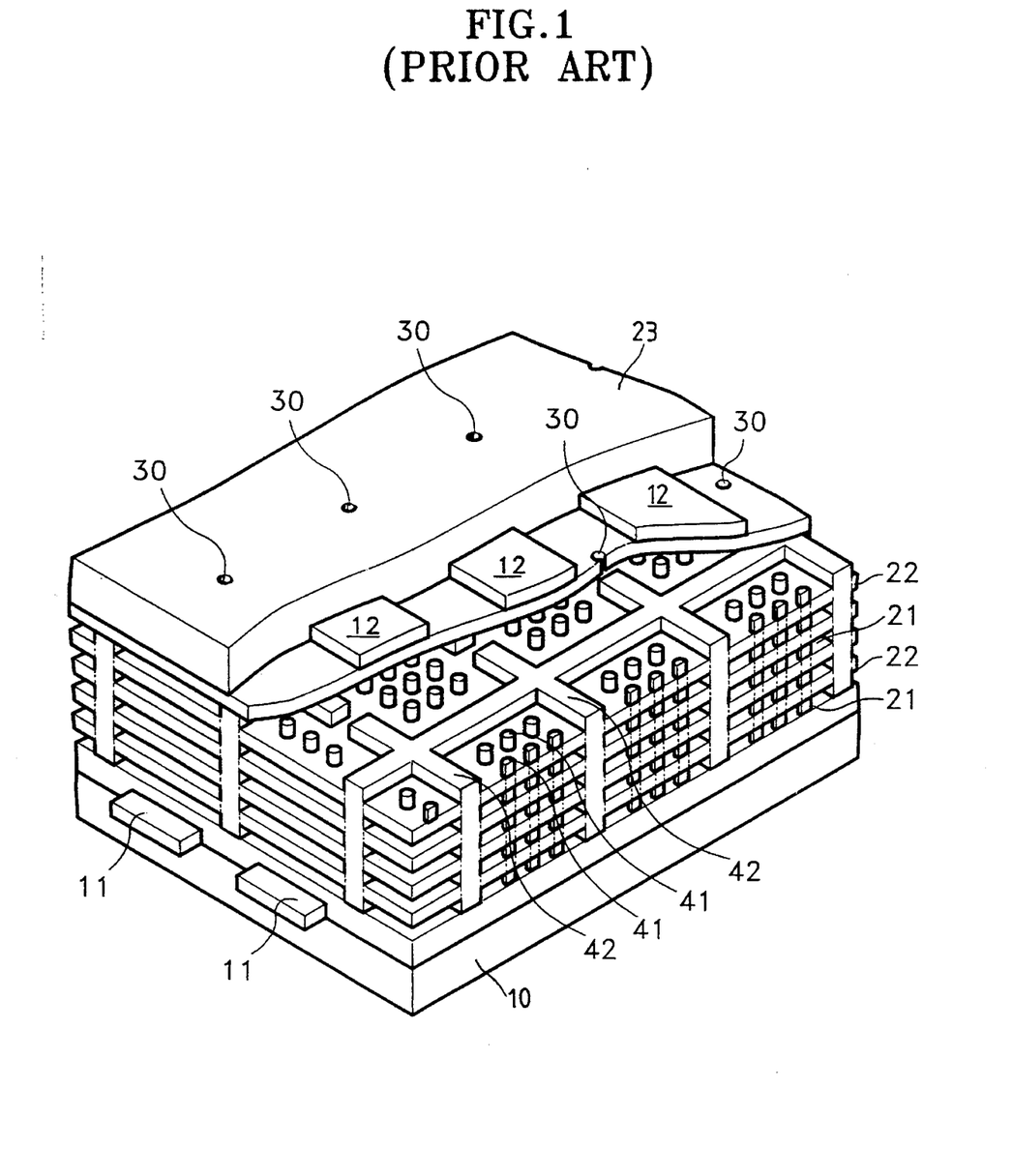
FIG. 1 is a partially cut away, extracted perspective view of liquid crystal display device previously proposed.
Figure 2:
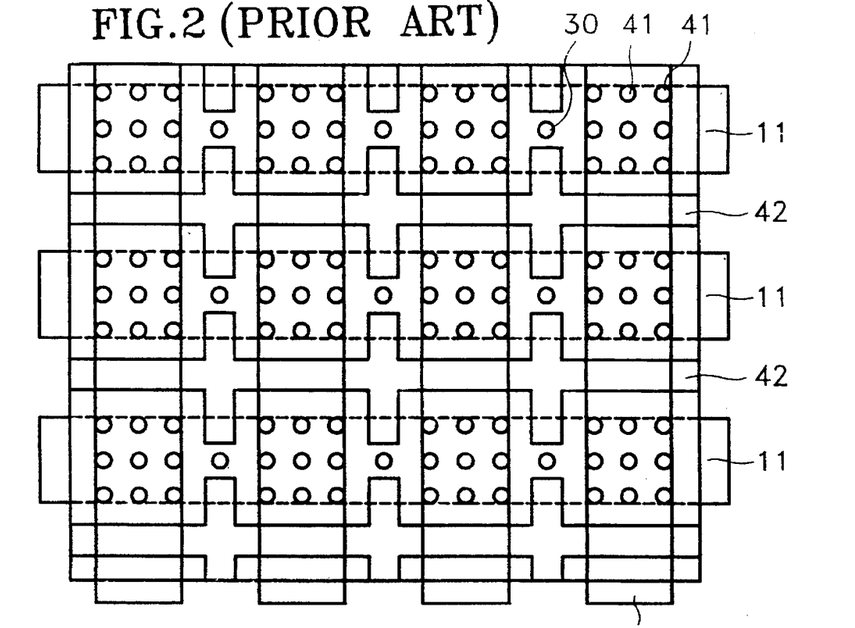
FIG. 2 is a layout of the liquid crystal display device shown in FIG. 1.
Figure 3:
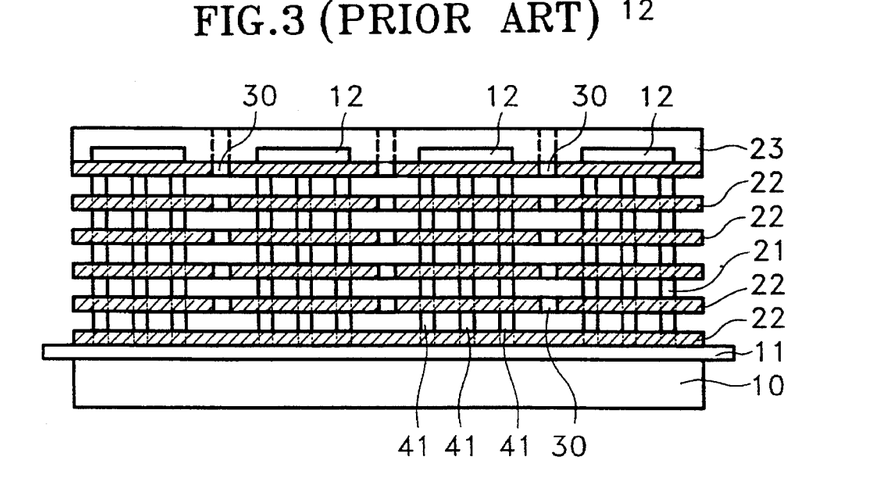
FIG. 3 is a side cross-sectional view of the liquid crystal display device shown in FIG. 1, in which respective elements are arranged.
Figure 4:
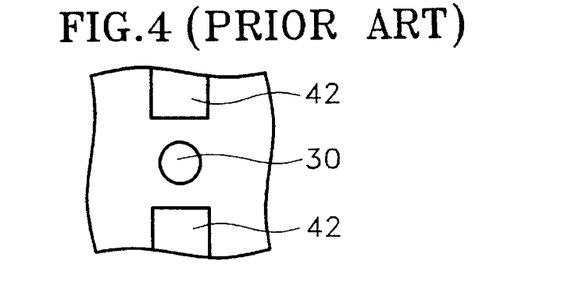
FIG. 4 is an extracted, enlarged plan view of a liquid crystal injection hole of the liquid crystal display device shown in FIG. 1.

FIGS. 1, 2, 3 and 4 illustrate a liquid crystal display having a greatly improved structure with respect to that first proposed by Yamamura. Referring to FIGS. 1, 2 and 3, electric-field-effect liquid crystal layers 21 are located between opposing striped electrodes 11 and 12. Columnar supports 41 are placed within a pixel area of the liquid crystal area, and latticed supports 42 being discontinuous at regular intervals are located outside the pixel areas. The supports 41 and 42 are provided in liquid crystal layer 21. Insulating layers 22 divide the liquid crystal into their respective layers 21 and are secured by supports 41 and 42. Liquid crystal injection holes 30 are formed in the insulating layers corresponding to the portions where latticed supports 42 become discontinuous. Here, the thickness of respective liquid crystal layers 21 should be below 3 μm, with the thickness of insulating layers being below 5 μm. In the disclosure, Yamamura indicates that epoxy resin, or, as the case may be, a metal oxide and especially aluminum oxide, may be used for insulating layer 22. A manufacturing process for the above liquid crystal display has the following steps:

(a) An electrode made of conductive material is formed on an electrically insulating glass substrate;

(b) An electrically insulating light-transmitting material, which cannot be dissolved by a predetermined solvent, is coated on the electrode so as to form an insulating layer;

(c) A material which can be dissolved by the above predetermined solvent is coated on the insulating layer so as to form a dissolution layer;

(d) Steps (b) and (c) are repeated for predetermined number of times so as to form a stack of insulating and dissolution layers;

(e) An electrode made of a light-transmitting conductive material is formed on the stack of the insulating and dissolution layers;

(f) First holes are vertically perforated through the stack formed from step (b) to step (d) at predetermined intervals, and the holes are filled with a light-hardening material so as to form vertical supports;

(g) Injection holes are formed in the stack at predetermined intervals, and the solvent is fed therethrough to remove the dissolution layer formed during step (c); and (h) Liquid crystal is filled in the space from which the dissolution layer is removed, through the liquid crystal injection holes, and, finally, the holes are plugged.

In the above-described manufacturing method, the material for the dissolution layer for securing a space for liquid crystal to be filled is water-soluble PVA, and the material of the insulating layer is epoxy resin. Here, aluminum can be used for the water-soluble PVA and metal oxide can be used for the epoxy resin. However, in the method, the steps for forming the insulating layer and supports are very complicated, and other elements may be damaged during the etching step.

Particularly, when the dissolution layer is dissolved via the liquid crystal injection holes for injecting liquid crystal into a cavity formed by the dissolution of the dissolution layer, which are designed to be spaced apart from the supports, etching requires an excessively long time because the total area of the dissolution layer is about 200 times that of the liquid crystal injection holes. During etching, the shape of the liquid crystal injection holes tends to become deformed, and the deformed injection holes cause trouble in injecting liquid crystal.

SUMMARY OF THE INVENTION

Therefore, it is an object of the present invention to provide a liquid crystal display and manufacturing method therefor in which the structure of a liquid crystal injection hole is reinforced so as to prevent deformation thereof during dissolution of the dissolution layer, and to thereby facilitate a subsequent injection of liquid crystal through the injection hole.

To accomplish the object of the present invention, there is provided at least one auxiliary support formed adjacent to the liquid crystal injection holes formed in the insulating layers. The auxiliary supports function as reinforcement to suppress the deformation of the liquid crystal injection holes through the insulating layers, especially when the dissolution layer is dissolved by solution. Since the injection holes are not deformed (or deformed less than they would otherwise be), injection of liquid crystal into the injection holes is facilitated.

The liquid crystal displays of the present invention are further characterized in that part of auxiliary supports are placed around the periphery of the liquid crystal injection holes, and in that the main supports include columnar supports placed inside the pixel areas and/or latticed supports placed outside the pixel areas. The liquid crystal injection holes and auxiliary supports for reinforcing the holes are formed in portions where the latticed supports are discontinuous.

In the method of the present invention, a liquid crystal display is manufactured by the steps of: forming a plurality of preferably first electrodes of a conductive material in a predetermined pattern; forming on the first electrodes at least one insulating layer of a material which cannot be dissolved by a predetermined solvent; forming on the insulating layer a dissolution layer made of a material which can be dissolved by the solvent; alternately forming the insulating layer and dissolution layer to thereby create a stack of a plurality of the layers; vertically etching the stack in a predetermined pattern to form a plurality of wells; filling the wells with a predetermined material to thereby form main supports which maintain a predetermined distance between the insulating layers, and auxiliary supports for providing reinforcement to liquid crystal injection holes formed in a subsequent step; forming a plurality of striped parallel second electrodes on the topmost insulating layer; vertically perforating portions near the auxiliary supports to thereby form the liquid crystal injection holes; supplying the solvent via the liquid crystal injection holes so as to dissolve all of the dissolution layers of the stack; feeding liquid crystal via the liquid crystal injection holes to fill cavities formed after the dissolution layers are dissolved and removed to form liquid crystal layers; and sealing the liquid crystal injection holes to thereby maintain the liquid crystal layers in the display.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

The present invention substantially relates to the above-described LCD device as suggested by the aforementioned Yamamura application. With exception to the characterizing features of the present invention, all elements of this embodiment are based upon the previously suggested device and general knowledge for one skilled in the art, and thus will not be specifically explained. Further, in the embodiment, a light-transmitting LCD device will be discussed, which is merely one preferred embodiment and does not restrict the scope of the present invention.

Figure 5A:
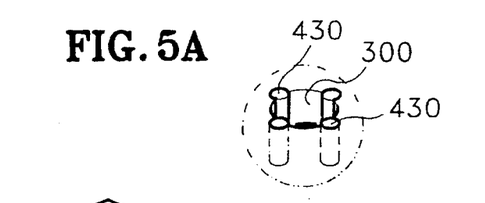
FIGS. 5A and 5B are a partially cut away, extracted perspective views of a liquid crystal display device of the present invention.
Figure 5B:
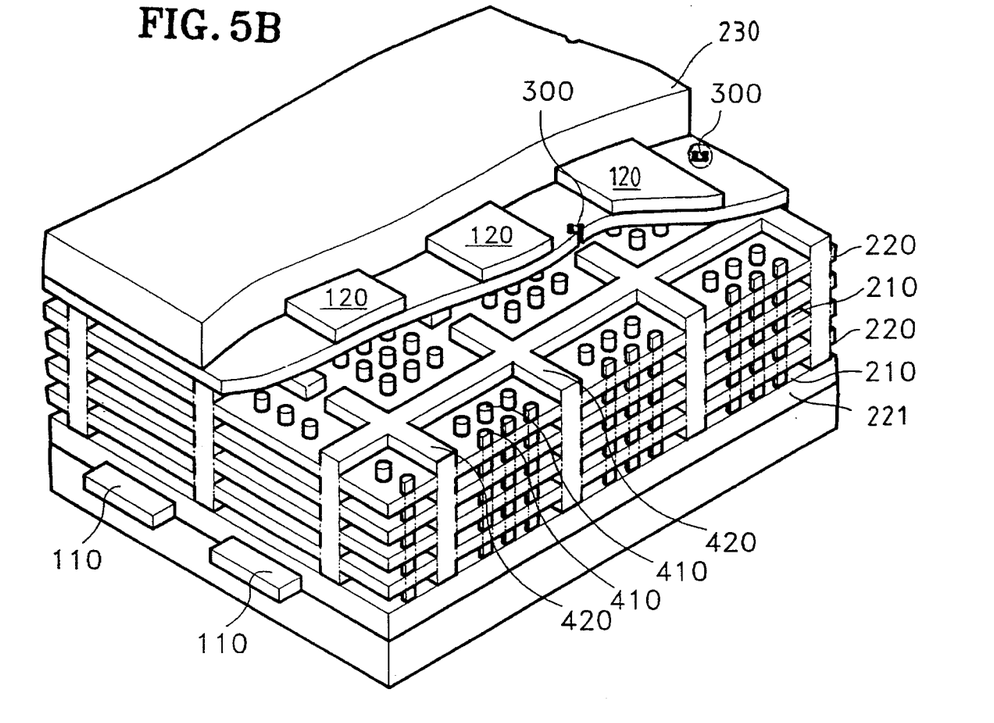

Referring to FIGS. 5A and 5B, the LCD device of the present invention has a structure considerably similar to that previously suggested and shown in FIG. 1. Here, the difference is that auxiliary supports 430 are formed around liquid crystal injection holes 300 and serve as reinforcement means. The auxiliary supports are the characterizing feature of the present invention.

Paralleling the previous Yamamura device, electric-field-effect liquid crystal layers 210 are provided between opposing striped electrodes 110 and 120, and insulating layers 220 for dividing liquid crystal layer 210 into plural layers are placed therein. The distances between the insulating layers are maintained by columnar supports 410 each having a diameter about 5 µm and being located inside pixel areas and by latticed supports 420 each being about 2 µm wide and discontinuous at equal intervals outside the pixel areas. The insulating layers 220 are secured by the supports 410 and 420. Liquid crystal injection holes 300 having 10–15 µm diameters are provided in the part of the insulating layers which corresponds to the discontinuous portion of latticed supports 420. Here, the thickness of liquid crystal layers 210 should be below 3 μm, with the thickness of insulating layers 220 being below 5 μm. In addition to such structure, as shown more clearly in FIG. 6, a plurality of auxiliary supports 430 are equipped around liquid crystal injection holes 300 as mentioned before. The auxiliary supports, which are about 5 μm in diameter, are formed by distorting the periphery of the liquid crystal injection holes or by merely making contact therewith or being placed adjacent thereto. It is desirable that the auxiliary supports be provided substantially on the periphery of all liquid crystal injection holes 300. If required, for instance, the auxiliary supports can be formed only on portions where extreme etching deformation occurs, in accordance with repeated experimentation. In the above-discussed structure, columnar supports 410 and latticed supports 420 are merely specific examples, and can be developed into various forms, depending upon design modifications in accordance with intended objects.

Further, the position of the liquid crystal injection holes are not limited. Though it is difficult, due to the general structure of liquid crystal display device, for such holes to be arranged within the pixel areas where the electrodes intersect, the liquid crystal injection holes can be placed within certain pixel areas intentionally or according to a special design. In this case, the auxiliary supports will be also located within the pixel areas.

In such a configuration, substrate 100 (see FIGS. 7–15) is made of a general transparent material such as transparent glass or transparent plastic. First and second electrodes 110 and 120 are preferably made of indium-tin oxide and have an X-Y matrix array. The insulating layers are made of acryl resin and have a thickness of 2,000 Å to 1 μm which is the same as that of the liquid crystal layers.

A light-blocking layer for light absorption may be additionally provided around the pixel areas. It is preferable that the light-blocking layer should be black for light absorption in addition to its light blocking function, so as to enhance the contrast of the displayed image.

As the electric-field-effect liquid crystal for liquid crystal layers 210, the general nematic type, the cholesteric-nematic type using phase transition between general nematic phase and cholesteric-nematic phase, or the ferroelectric liquid crystal (FLC) can be used to create the orderly alignment of the crystal which permits the passage of light or scatters the incident light internally so as to block the passage of light, according to the presence or absence of an electric field. Here, the degree of an opaque state (light blockage) in which an electric field is not formed is varied in accordance with the degree of disorder of the liquid crystal orientation.

From here on, a manufacturing method for the liquid crystal display device of the present invention will be described with reference to FIGS. 7–15.

Figure 7:
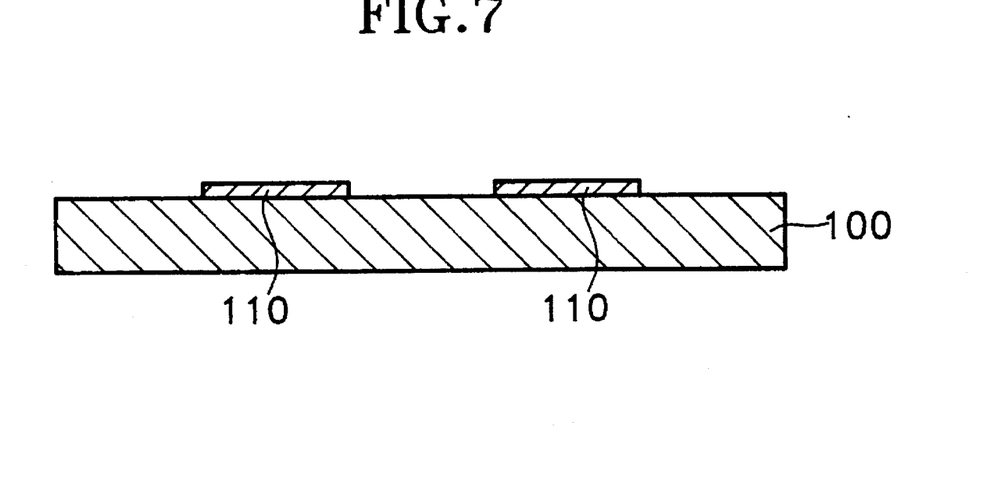
FIGS. 7–15 are cross-sectional views of the liquid crystal display device used to show the manufacturing steps in the manufacturing method of the present invention.

Referring to FIG. 7, a plurality of electrodes 110 made of a conductive material are formed in parallel in a predetermined pattern, for instance, as stripes on a substrate 100 of glass or an epoxy-resin plastic.

Figure 8:
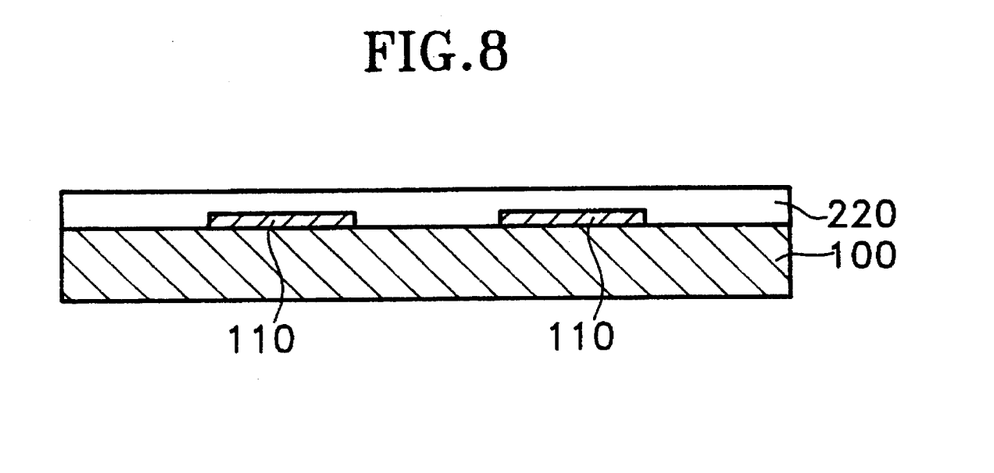
Figure 9:
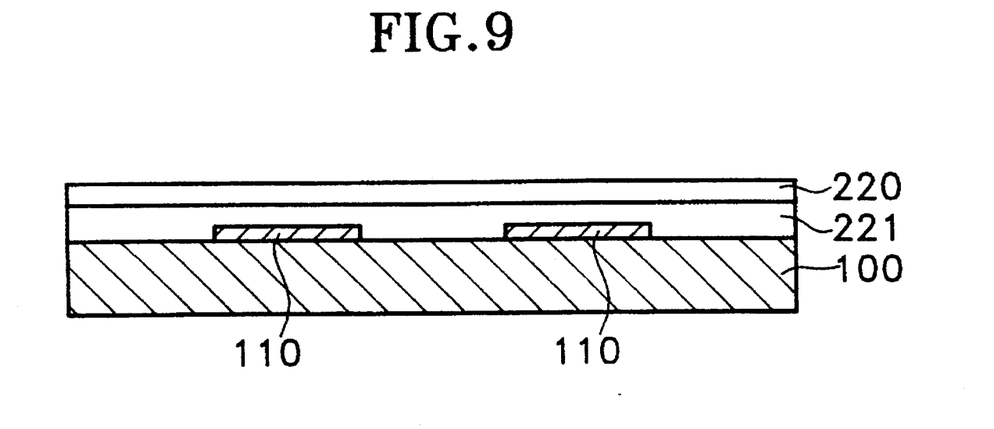

Referring to FIG. 8, a material which is not dissolvable by a predetermined solvent, for instance, acryl resin or epoxy resin is coated on first electrode 100 to thereby form a lowest insulating layer 221 as a first-electrode protecting layer. Referring to FIG. 9, if necessary, an insulating layer 220 may be further formed thereon. Here, the insulating layer 220 may be of the same or a different material from the lowest insulating layer 221.

Figure 10:
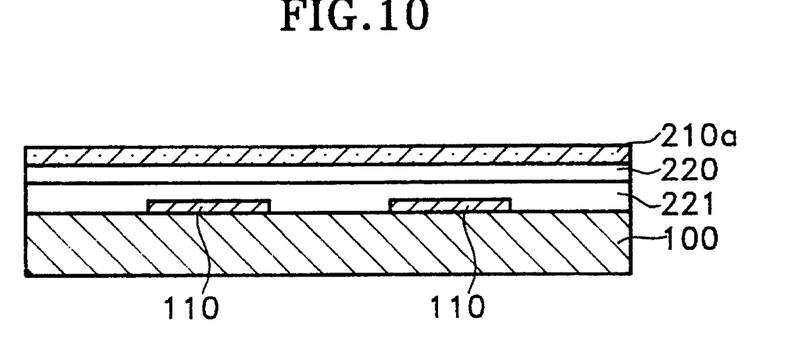

Referring to FIG. 10, a dissolution layer 210a of a material which is dissolvable by a predetermined solvent, for instance, a polyamide is formed on insulating layer 220. Here, the materials for dissolution layer 210a and insulating layer 220 having a solubility and insolubility with respect to a given solvent, respectively, should be chosen.

Figure 11:
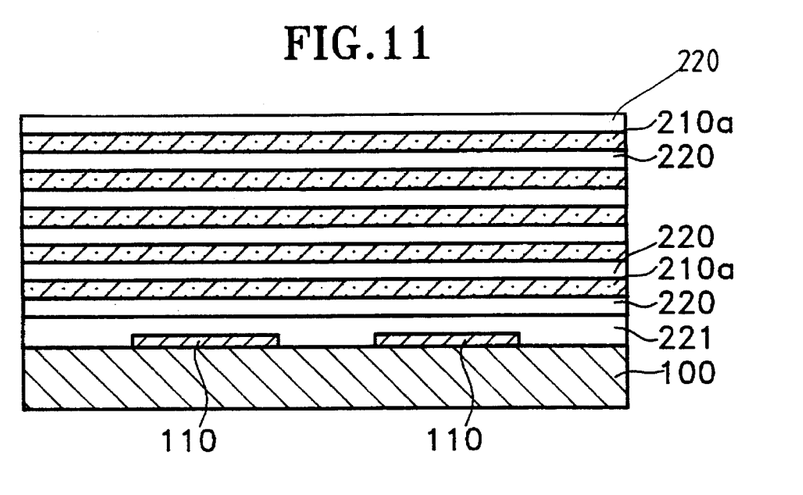

Referring to FIG. 11, insulating layer 220 and dissolution layer 210a are alternately and repeatedly stacked to obtain a multi-layer stack, for instance, a five-layer stack.

Figure 6:
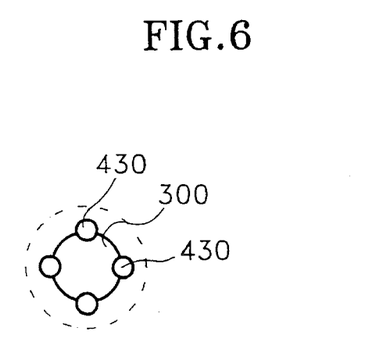
FIG. 6 is an extracted, enlarged plan view of a liquid crystal injection hole of the liquid crystal display device, according to the present invention.
Figure 12:
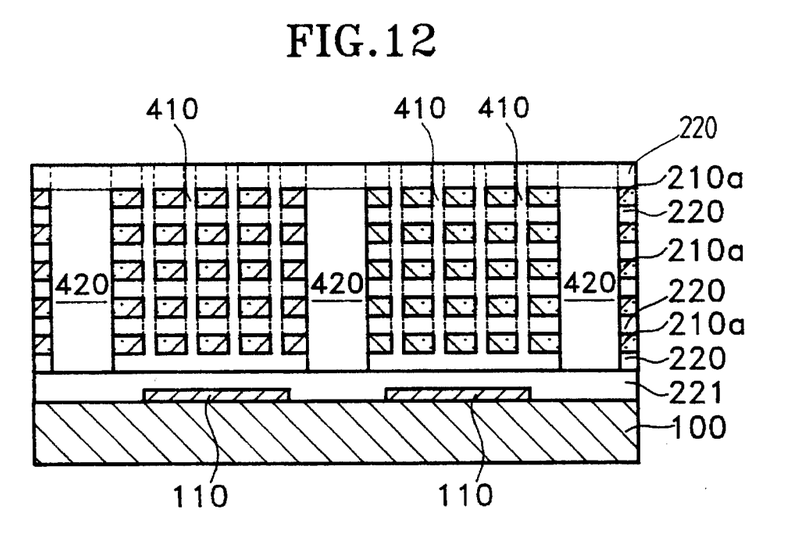

Referring to FIG. 12, the stack of layers 210a and 220 is vertically etched in a predetermined pattern to thereby form wells for supports. Here, to form the wells, repeated wet etching or one-time or repeated dry etching is employed. The most desirable method adopts the reactive ion etching. Subsequently, a material such as epoxy resin is filled in the wells to thereby form supports 410 and 420. Here the supports are classified into columnar supports 410, latticed supports 420 which are discontinuous at equal intervals, and auxiliary supports 430 placed around liquid crystal injection holes 300. Particularly, a plurality of auxiliary supports 430 are formed in a circular array in portions where liquid crystal injection holes 300 are to be formed, as shown in FIG. 6.

Figure 13:
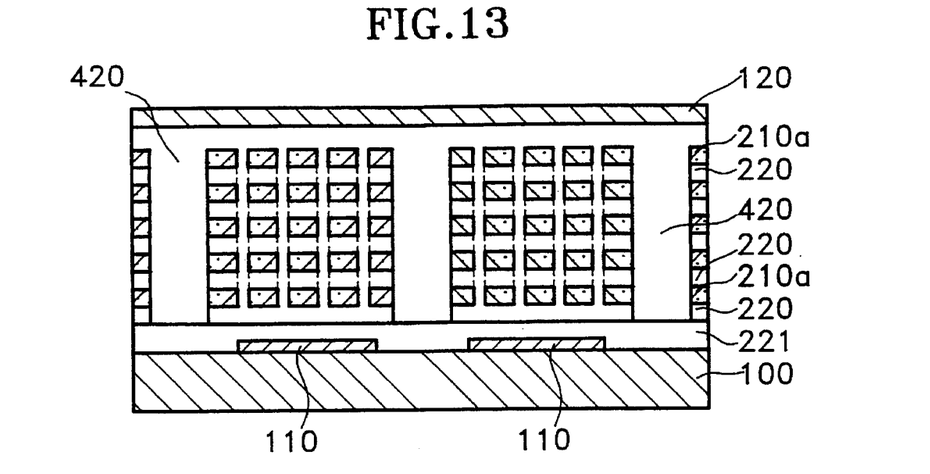

Referring to FIG. 13, a plurality of striped second electrodes 120 are formed in parallel on the topmost insulating layer.

Figure 14:
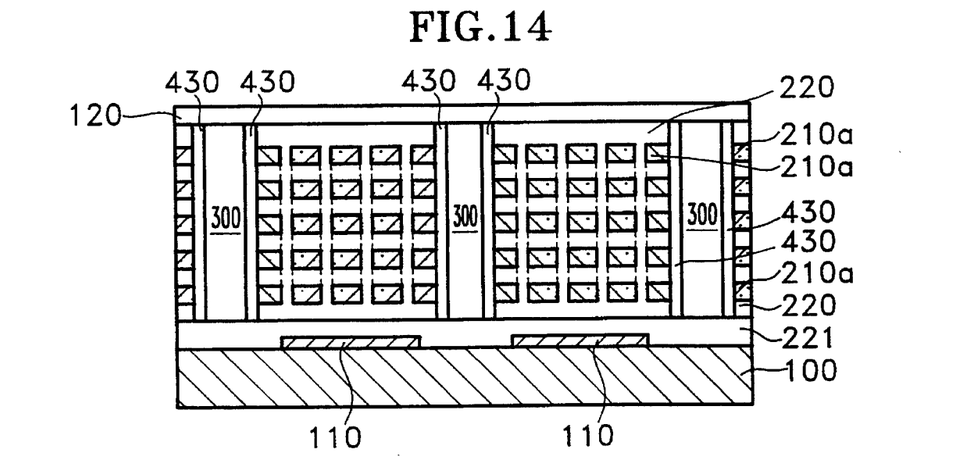

Referring to FIG. 14, liquid crystal injection holes 300 are formed by vertical perforation of auxiliary supports 430. Liquid crystal injection holes 300 are provided above the holes on the portions where second electrodes 120 are not formed. The solvent is fed via liquid crystal injection holes 300 so as to dissolve all of dissolution layers 210a of the stack and to thereby form cavities for injection of liquid crystal around supports 410, 420 and 430. In other words, a solvent, for instance, hydrochloric acid, is supplied via liquid crystal injection holes 300 to dissolve and remove dissolution layers 210a, and therefore the portions where dissolution layers 210a were present become cavities. Here, insulating layers 220 for dividing the cavities maintain a predetermined distance by the remaining supports 410, 420 and 430.

Figure 15:
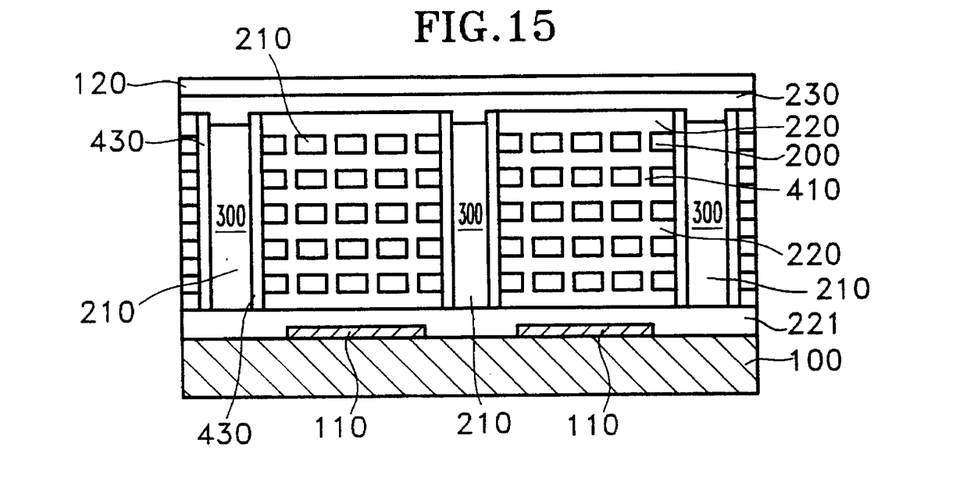

Referring to FIG. 15, liquid crystal is fed via liquid crystal injection holes 300 to fill the cavities formed after removing dissolution layers 210a and to thereby form liquid crystal layers 210. Subsequently, liquid crystal injection holes 300 are sealed.

In the manufacturing method for the present invention, the second electrodes can be formed before or after the formation of the liquid crystal injection holes.

In the liquid crystal display device and manufacturing method therefor according to the present invention, since the auxiliary supports provided around the liquid crystal injection holes reinforce structurally the liquid crystal injection holes, the deformation of the liquid crystal injection holes, which is caused due to the solvent during etching of the dissolution layers, can be prevented. This allows to keep the original form of the liquid crystal injection holes, and therefore facilitates the injection of liquid crystal during the subsequent liquid-crystal filling step.

Accordingly, the manufacturing method of the present invention can prevent the deformation of liquid crystal injection hole by forming auxiliary supports for reinforcing the liquid crystal injection holes prior to an etching process. The present invention enables smooth injection of liquid crystal and thus a relative reduction in the time required to fill in the liquid crystal, which results in decreasing the number of defective products.

What is claimed is:

1. A liquid crystal display comprising:

a substrate;

a plurality of first electrodes arranged on said substrate in a predetermined pattern;

a plurality of second electrodes which cooperate with said first electrodes to define a plurality of pixel areas;

a plurality of insulating layers for separating each said pixel area into a plurality of spaces between said first and second electrodes;

liquid crystal disposed in said spaces defined by said insulating layers to form at least two liquid crystal layers between said first and second electrodes;

main supports within each pixel area for securing said insulating layers in position; and a plurality of auxiliary supports disposed adjacent to liquid crystal injection holes formed in said insulating layers, said auxiliary supports providing reinforcement for said injection holes to prevent deformation thereof.

2. A liquid crystal display as claimed in claim 1, wherein said auxiliary supports are positioned around the periphery of said liquid crystal injection holes.

3. A liquid crystal display as claimed in claim 2, wherein said main supports include latticed supports defining each pixel area.

4. A liquid crystal display as claimed in claim 3, wherein said main supports include columnar supports disposed within the pixel areas, and wherein said liquid crystal injection holes and auxiliary supports for reinforcing the holes are formed in portions where said latticed supports are discontinuous.

5. A liquid crystal display as claimed in claim 2, wherein said main supports include columnar supports disposed within the pixel areas.

6. A liquid crystal display as claimed in claim 1, wherein said main supports include latticed supports defining each pixel area.

7. A liquid crystal display as claimed in claim 1, wherein said main supports comprise columnar supports disposed within the pixel areas.

8. A liquid crystal display comprising:

two opposing electrodes;

a plurality of electric-field-effect liquid crystal layers disposed between said two electrodes;

insulating layers for dividing said liquid crystal layers;

main supports for maintaining a predetermined distance between said insulating layers;

auxiliary supports disposed about liquid crystal injection holes formed in said insulating layers; and liquid crystal disposed in said liquid crystal layers and said liquid crystal injection holes.

9. A liquid crystal as claimed in claim 8, wherein said auxiliary supports are disposed about the periphery of said liquid crystal injection holes.

10. A liquid crystal display as claimed in claim 9, wherein said main supports include latticed supports defining the pixel areas.

11. A liquid crystal display as claimed in claim 9, wherein said main supports include columnar supports disposed inside the pixel areas.

12. A liquid crystal display as claimed in claim 8, wherein said main supports include latticed supports defining the pixel areas.

13. A liquid crystal display as claimed in claim 12, wherein said liquid crystal injection holes and auxiliary supports for reinforcing the holes are formed in portions where said latticed supports are discontinuous.

14. A liquid crystal display as claimed in claim 8, wherein said main supports include columnar supports disposed inside the pixel areas.

15. A manufacturing method for a liquid crystal display comprising the steps of:

forming a plurality of first electrodes of a conductive material on a substrate in a predetermined pattern;

forming on said first electrodes at least one insulating layer of a material which cannot be dissolved by a predetermined solvent;

forming on said insulating layer a dissolution layer of a material which can be dissolved by said predetermined solvent;

alternately forming said insulating layer and dissolution layer to thereby create a stack of said layers;

vertically etching said stack in a predetermined pattern to form a plurality of wells;

filling said wells with a predetermined material to thereby form main supports which maintain a predetermined distance between said insulating layers and auxiliary supports for providing reinforcement to adjacent liquid crystal injection holes formed in a subsequent step;

forming a plurality of striped parallel second electrodes on a topmost insulating layer;

vertically perforating portions of said liquid crystal display adjacent to auxiliary supports to form said liquid crystal injection holes;

supplying said predetermined solvent through said liquid crystal injection holes to dissolve said dissolution layers of said stack;

feeding liquid crystal through said liquid crystal injection holes to fill cavities formed after said dissolution layers are dissolved and removed to thereby form liquid crystal layers; and sealing said liquid crystal injection holes to maintain said liquid crystal layers in said display.

16. A manufacturing method for a liquid crystal display comprising the steps of:

forming a plurality of first electrodes of a conductive material in a predetermined pattern;

forming on said parallel first electrodes at least one insulating layer of a material which cannot be dissolved by a predetermined solvent;

forming on said insulating layer a dissolution layer made of a material which can be dissolved by said predetermined solvent;

alternately forming said insulating layer and dissolution layer to thereby create a stack of said layers;

vertically etching said stack in a predetermined pattern to form a plurality of wells;

filling said wells with a predetermined material to thereby form main supports which maintain a predetermined distance between said insulating layers and auxiliary supports for providing reinforcement to adjacent liquid crystal injection holes formed in a subsequent step;

vertically perforating portions of said liquid crystal display adjacent to said auxiliary supports to form said liquid crystal injection holes;

supplying said predetermined solvent through said liquid crystal injection holes so as to dissolve said dissolution layers of said stack;

feeding liquid crystal through said liquid crystal injection holes to fill cavities formed after said dissolution layers are dissolved and removed to thereby form liquid crystal layers;

sealing said liquid crystal injection holes to maintain said liquid crystal layers in said display; and forming a plurality of striped parallel second electrodes on a topmost insulating layer.

* * * * *